United States Patent
Stauder et al.

(10) Patent No.: US 8,724,893 B2
(45) Date of Patent: May 13, 2014

(54) METHOD AND SYSTEM FOR COLOR LOOK UP TABLE GENERATION

(75) Inventors: Jürgen Stauder, Montreuil/Ille (FR); Hasan Sheikh Faridul, Cesson Sevigne (FR); Vincent Demoulin, Montfort sur Meu (FR)

(73) Assignee: Thomson Licensing, Issy les Moulineaux (FR)

( * ) Notice: Subject to any disclaimer, the term of this patent is extended or adjusted under 35 U.S.C. 154(b) by 83 days.

(21) Appl. No.: 13/615,280

(22) Filed: Sep. 13, 2012

(65) Prior Publication Data
US 2013/0077859 A1 Mar. 28, 2013

(30) Foreign Application Priority Data
Sep. 27, 2011 (EP) .................................. 11306224

(51) Int. Cl.
*G06K 9/00* (2006.01)
(52) U.S. Cl.
USPC ........................................... 382/162
(58) Field of Classification Search
USPC ........... 382/162, 167, 274; 345/589, 600, 601
See application file for complete search history.

(56) References Cited

U.S. PATENT DOCUMENTS

| | | | |
|---|---|---|---|
| 5,212,546 A | 5/1993 | Arazi et al. | |
| 5,583,665 A | 12/1996 | Gregory et al. | |
| 6,137,903 A | 10/2000 | Dichter | |
| 6,950,109 B2 * | 9/2005 | Deering | 345/589 |
| 7,551,802 B2 | 6/2009 | Ming | |
| 7,663,640 B2 * | 2/2010 | Nayar et al. | 345/589 |
| 2009/0052776 A1 | 2/2009 | Panahpour et al. | |
| 2009/0169107 A1 | 7/2009 | Chien et al. | |
| 2009/0257652 A1 | 10/2009 | Liu et al. | |
| 2010/0194851 A1 | 8/2010 | Pasupaleti et al. | |

FOREIGN PATENT DOCUMENTS

| | | |
|---|---|---|
| CN | 101488224 | 7/2009 |
| CN | 101753771 | 6/2010 |
| KR | 100591608 | 6/2006 |

OTHER PUBLICATIONS

J. Da Rugna et at.: "Color interest points detector for visual information retrieval" Organization: Univ. Jean Monnet, St. Etienne, Jan. 21-23, 2002.

P. E. Forssen: "Maximally Stable Colour Regions for Recogition and Matching", IEEE Conference on Computer Vision and Pattern Recognition. Minneapolis, USA, Jun. 2007.

(Continued)

*Primary Examiner* — Phuoc Tran
(74) *Attorney, Agent, or Firm* — Robert D. Shedd; Patricia A. Verlangieri

(57) ABSTRACT

In accordance with an exemplary embodiment, a method is provided to generate a color look up table for multiple images. The method includes selecting color points from a first image. The first color points comprise weak image texture. The method also includes identifying feature points in a spatial neighborhood of each first color point. Additionally, the method includes identifying feature points from a second image. The second feature points correspond to the first feature points. The method also includes determining a color points in the second image. The second color points correspond to the first color points, and are determined using a spatial interpolation of the first plurality of color points from the first plurality of feature points and then applying the obtained spatial interpolation to the second plurality of feature points. Further, the method includes generating the color lookup table.

12 Claims, 4 Drawing Sheets

(56) References Cited

OTHER PUBLICATIONS

D. Fuiorea et al.: "A new point matching method for image registration" Communication Department "Potitehnica" Univ. of Timisoara, Dec. 14-16, 2007.
J. Gao et al.: "Color-based SIFT feature point detection and matching" China Academic Journal Electonic Publishing House, Jan. 2007, Abstract.
R. Garcia et al.: "Detection of matchings in a sequence of underwater images through texture analysis", IEEE Oct. 7-10, 2001.
J.H. Jung et at.: "Color Correction for Multi-view Video Coding Based on Camera Characteristics", IEEE Special Issue on 3D-TV Horizon, Aug. 23, 2011.
D.G. Lowe: "Distinctive image features from scale invariant keypoints" Int. Journal of Computer Vision 60(2), 91-110 Jan. 5, 2004.
M. Tehrani et al.: "Iterative colour correction of multicamera systems using corresponding feature points", Journal of Visual Communication and Image Representation, Apr. 4, 2010.
V.J.D Tsai et al.: "Automated image mosaicking" Journal of the Chinese Institute of Engineers, vol. 28, No. 2, pp. 329-340, date Jan. 2005.
Q, Wang et al.: "A Robust Algorithm for Color Correction between Two Stereo images" Lecture Notes in Computer Science, Jan. 2010, vol. 5995/2010, pp. 405-416.
Guicai Wang et al.: "Stereo Matching Algorithm Based on Image Segmentation and Features Point" IEEE, Jan. 2009.
K. Yamamoto et al.: "Color correction for multi-view video using energy minimization of of view networks", International of Automation and Computing, pp. 234-245, Jul. 2008.
Q. Zhu et al.: "A reliable image matching method based on self-adaptive triangle constraint", Chinese Journal of Computers, vol. 28, No. 10, Oct. 2005, Abstract.

* cited by examiner

202

METHOD AND SYSTEM FOR COLOR LOOK UP TABLE GENERATION

This application claims the benefit, under 35 U.S.C. §119 of EP Patent Application 11306224.4, filed 27 Sep. 2011.

FIELD OF THE INVENTION

The present invention relates to the field of electronic imaging devices. In particular, exemplary embodiments of the present invention relate to a method and system for generating a color look up table from two images.

BACKGROUND OF THE INVENTION

Image processing involves the use of multiple images of a scene to generate a new image. The images input to image processing may include video images. For example, stereographic imaging generates three-dimensional (3D) images from two images of the same scene. The images may be generated using two cameras, with each camera recording the scene from different viewpoints. In some cases, the two cameras may record the scene in different colors. In other words, some of the same elements of a scene may appear differently colored to each of the cameras. This may be due to a difference in lighting and reflection when viewing a scene at different viewpoints. It may also be due to other factors, one of those factors being characteristics of the cameras such as focal length, aperture, color balance, automatic luminance control. The images used may be video images.

Typically, image processing involves geometric processing, and photometric and color processing. Geometric processing usually extracts corresponding feature points from two images. A feature point is a specific point in an image that has been detected and that is characterized by specific image signal characteristics such as color, spatial frequency or edges. Corresponding feature points are two or more feature points in two or more images that have been identified to correspond to the same semantic scene element. Geometric process also calculates one or more of: camera position, internal camera parameters, scene depth, and disparity of objects. The disparity is the deformation of image content between two images e.g. caused by the 3D shape of objects. Extraction of corresponding feature points is typically performed in two steps: detecting feature points, and searching for corresponding feature points.

One method for feature point detection and correspondence is called Scale Invariant Feature Transform (SIFT). The SIFT method employs a detector based on Difference of Gaussian (DoG) and a descriptor that relies on the distribution of gradient vectors orientation.

Photometric and color processing deals with color differences between images. Typically, color differences are not an issue in image processing if they result from an intended operation. For example, in U.S. Pat. No. 5,583,665 to Gregory, Jr., et al., an image is combined with a color transform, called a "color tracer" or "color grid." The color transform is based on a Color Look Up Table (CLUT). The CLUT entries form a grid in color space. In some cases, a CLUT may be defined just for a local image region. The grid may contain colors that are not in the image. The CLUT may also be in the same file as the image. Typically, the CLUT is empty at the beginning of image processing. However, once an operator edits the color in the image, the edits may be registered into the CLUT. The CLUT can then be applied to other images using interpolation.

Photometric and color processing usually involves the extraction of corresponding colors in two or more input images. If these colors are arranged into a table, the table can be used as a CLUT in order to estimate one of: color differences, object reflectance, illuminant characteristics, light distribution, photometric camera parameters, and appearance of color in the images.

In U.S. Pat. No. 5,212,546 to Arazi, et al., a manual method for obtaining corresponding colors is described. Corresponding colors are organized into a CLUT. An operator determines and adjusts the CLUT by applying it to an image and comparing the transformed image to a reference image.

Another manual method for obtaining corresponding colors is described in the U.S. Pat. No. 6,137,903 to Dichter. This method results in one pair of corresponding colors. An indication is made on a computer screen of a group of source colors in a source image. A corresponding group of reference colors in a reference image is also indicated. The source colors and the reference colors are averaged resulting in a representative source color and a representative reference color, respectively.

Photometric and color processing also typically includes color mapping. Color mapping involves the use of known color correspondences between source colors in a source image and reference colors in a reference image. In U.S. Pat. No. 6,137,903 to Dichter, a color mapping method is based on a single color correspondence. Source colors are mapped to target colors by one of the following two steps. If a source color is the same as a representative source color, the source color is mapped to the representative reference color. In all other cases, the difference between the source color and the representative source color is calculated. The source color is mapped to a target color that has a corresponding distance to the representative reference color.

Another color mapping method is proposed in U.S. Patent Application Publication No. 2009/0257652 by Lie, et al. The method takes, as input, source images and a reference image (or portions of such images). Color correspondences are assumed to be available. In other words, a list of corresponding source and reference colors are known. The colors are assumed to sufficiently populate the color space. The method calculates a two-stage color transform capable of transforming the colors of the source image into colors of the reference image. The first stage calculates one-dimensional look up tables (LUTs) for each color channel. Color channels can be typically R, G, B for red, green and blue, respectively. If, for a single source color, multiple reference colors are observed, a mean reference color is calculated. The obtained tables can be smoothed by polynomial fitting. As an alternative, the 1D LUTs can be obtained by matching the cumulative distribution functions. In this case, color correspondences are not needed. The second stage transforms intermediate colors to reference colors. The intermediate colors are the source colors transformed by the first stage. The second stage allows cross color channel processing and calculates a linear 3×3 matrix by regression on the color correspondences.

Known methods for the extraction of corresponding colors in two or more input images include direct and indirect approaches. An example for a direct approach is the Maximally Stable Color Regions method. In this method, uniformly colored regions ("color blobs") in the input images are selected that are stable against changing background. The correspondences between colored regions in the selected regions are then established.

In indirect approaches for the extraction of corresponding colors, colors are often chosen to be the colors of corresponding feature points. The corresponding features may be detected using the same methods as used in geometric processing. Those feature points are assumed to be robust against geometric changes. For example, corresponding feature points in two stereo images may be extracted using the SIFT method. Correspondences of the near neighborhood of a feature point in one input image may be established with the near neighborhood of a corresponding feature point in the second input image. Further, corresponding feature points can be exploited when color differences are to be compensated in more than two input images.

SUMMARY OF THE INVENTION

A method of generating a color look up table according to exemplary embodiments of the invention is set forth in claim 1. The method includes selecting color points from a first image. The first color points comprise weak image texture. The method also includes identifying feature points in a spatial neighborhood of each first color point. Additionally, the method includes identifying second feature points from a second image. The second feature points correspond to the first feature points. The method also includes determining second color points in the second image. The second color points correspond to the first color points, and are determined using a spatial interpolation of the first plurality of color points from the first plurality of feature points and then applying the obtained spatial interpolation to the second plurality of feature points. Further, the method includes generating the color lookup table. The color lookup table includes input colors comprising the first color points, and output colors comprising the second color points.

Exemplary embodiments of the present invention are described with reference to the accompanying drawings. These exemplary embodiments merely exemplify the invention. Plural possible modifications are apparent to the skilled person. The gist and scope of the present invention is defined in the appended claims of the present application.

DETAILED DESCRIPTION OF THE PREFERRED EMBODIMENTS

Direct methods for extraction of corresponding colors rely on corresponding color regions that are usually less robust than corresponding feature points. Indirect methods for extraction of corresponding colors rely on corresponding feature points. However, corresponding feature points are usually optimized for geometric processing but not for the extraction of corresponding colors. In existing methods, the feature correspondences depend heavily on the image content. They are not regularly distributed over the image, or are limited to include portions of the image. This may be due to the fact that feature points are selected at those image positions that allow identifying the corresponding feature point in the second image thanks to a specific, local image texture.

Known extraction methods for corresponding colors have the following disadvantages: limited color precision, limited coverage, and limited robustness. With regard to color precision, if corresponding colors are extracted from corresponding feature points, color extraction typically suffers from the potentially strong local texture of feature points. With regard to coverage, feature point correspondences are usually not dense. As such, if corresponding colors are extracted from corresponding feature points, the coverage of the image and of the color space may be poor. With regard to robustness, if corresponding colors are extracted from corresponding colored regions, the result will suffer from the limited robustness of extraction of corresponding color regions.

In an embodiment of the system, an approach for photometric and color processing may be based on the appearance of color in the images. When a semantic element of the scene appears in the different input images with different colors, respectively, these color differences are accounted for in some way with regard to the image appearance. For example, when an intermediate view is calculated from two given stereo views, color differences are compensated for. Some ways the color differences may be compensated for are linear or cubic interpolation of R, G, B color coordinates. Another example is the generation of 3D object models from input images. In this example, the texture of the object model is extracted from the input images. Accordingly, color differences between the input images are modeled and compensated.

Figure 1:
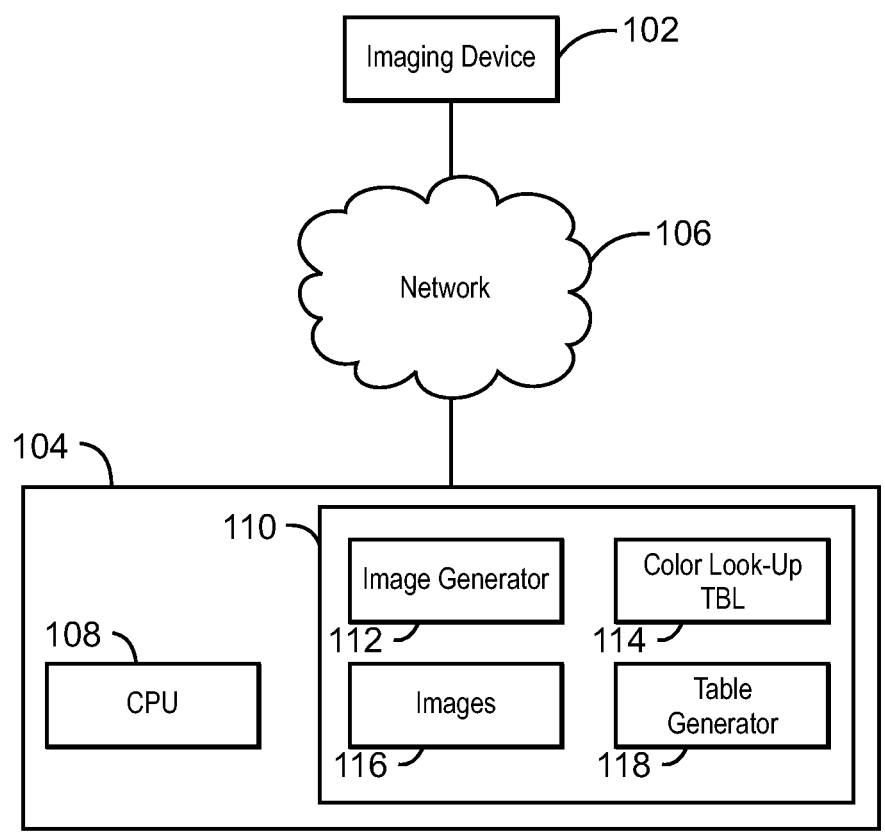
FIG. 1 is a block diagram of a system for generating a color look up table (CLUT), in accordance with an exemplary embodiment of the present invention.

FIG. 1 is a block diagram of a system 100 for generating a color look up table. The system 100 may include an imaging device 102 in communication with a computing device 104 over a network 106. The computing device 104 may include a central processing unit (CPU) 108, and a memory 110. The memory 110 may be any type of addressable electronic storage such as a random access memory (RAM), read-only memory (ROM), hard disk drives, removable discs, solid-state memory, etc.

The memory 110 may include an image generator 112, a CLUT 114, images 116, and a table generator 118. The image generator 112 may perform image processing on images 116, such as described above. The image generator 112 may use the color look up table (CLUT) 114. In one embodiment, the table generator 118 may generate the CLUT from two images 116 with given feature point correspondences. Each feature point correspondence may include a first feature point in a first image 116 and a corresponding feature point in the second image 116. The table generator 118 may assume that geometric feature point correspondences are available.

Figure 2:
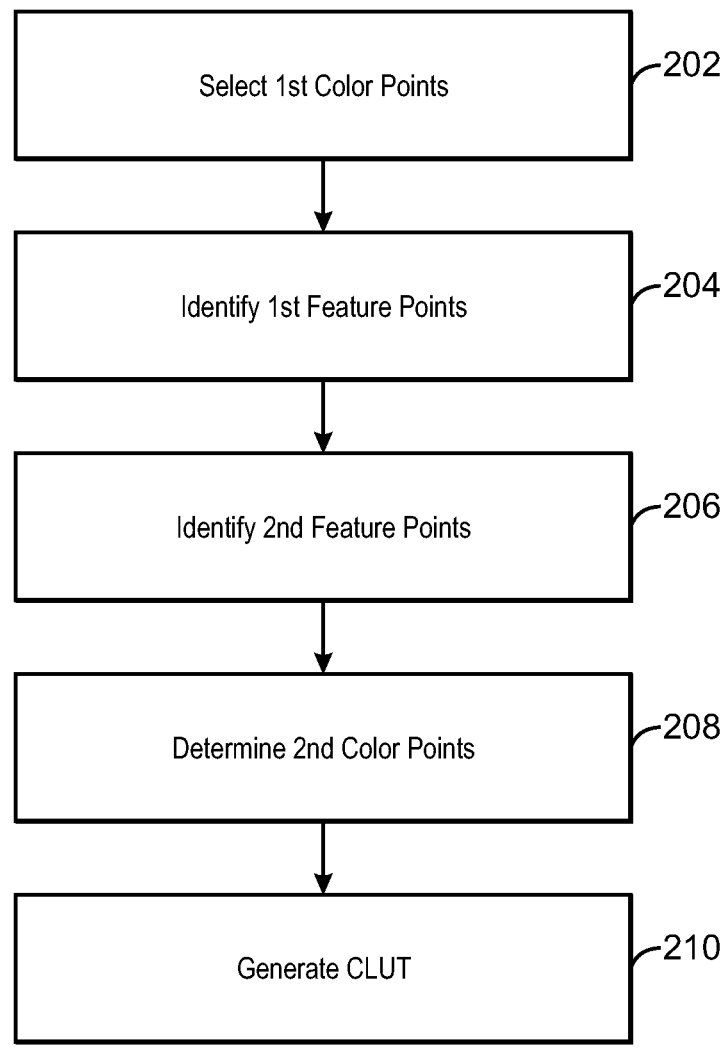
FIG. 2 is a process flow diagram of a method for generating a CLUT, in accordance with an exemplary embodiment of the present invention.

FIG. 2 is a process flow diagram of a method 200 of generating a color look up table, in accordance with an exemplary embodiment of the present invention. The method 200 may be embodied in a non-transient, computer-readable medium such as the memory 110 of FIG. 1 and may be executed by the table generator 118.

The method may begin at block 202, where the table generator 118 selects a first set of first color points in the first image having weak image texture. To have weak texture means that the variation of colors in a spatial neighbourhood is low.

At block 204, for each of said first color points, the table generator 118 may identify a first set of feature points in the first image. The first set of feature points may be restricted to feature points that lie in a spatial neighborhood of the first set of color points.

At block 206, the table generator 118 may identify a second set of feature points in the second image. The second set of feature points correspond to the first set of feature points.

At block 208, the table generator 118 may interpolate a second set of color points in the second image. For each of the first color points, a second, corresponding color point in the second image may be determined. The second color point may be calculated using a spatial interpolation of the first plurality of color points from the first plurality of feature points and then applying the obtained spatial interpolation to the second plurality of feature points.

At block 210, the table generator 118 may generate the CLUT. The CLUT input colors are the colors of the set of first color points and the CLUT output colors are the colors of the corresponding second set of color points. In a variation of this concept, the CLUT input colors are colors that are interpolated from a set of first color points and the CLUT output colors are the corresponding colors interpolated from the colors of the corresponding second set of color points. In this way, the CLUT input colors can have a predefined structure, for example being the edges of a regular grid in color space.

While the method 200 is described with respect to two input images, embodiments may use more than two input images. For example, the CLUT 114 for three images may be determined by first generating a CLUT 114 according to the method 200 for the first and second images, and then another CLUT for the second and third images. For example, in multi-view—more than two view—, either a CLUT 114 may be generated between a reference image and each of the rest of the images. Alternatively, a CLUT 114 may be generated between the first and second image, another between the second and third image, etc. In this way, the color diffrences between the images can be described in a consisting way.

Figure 3:
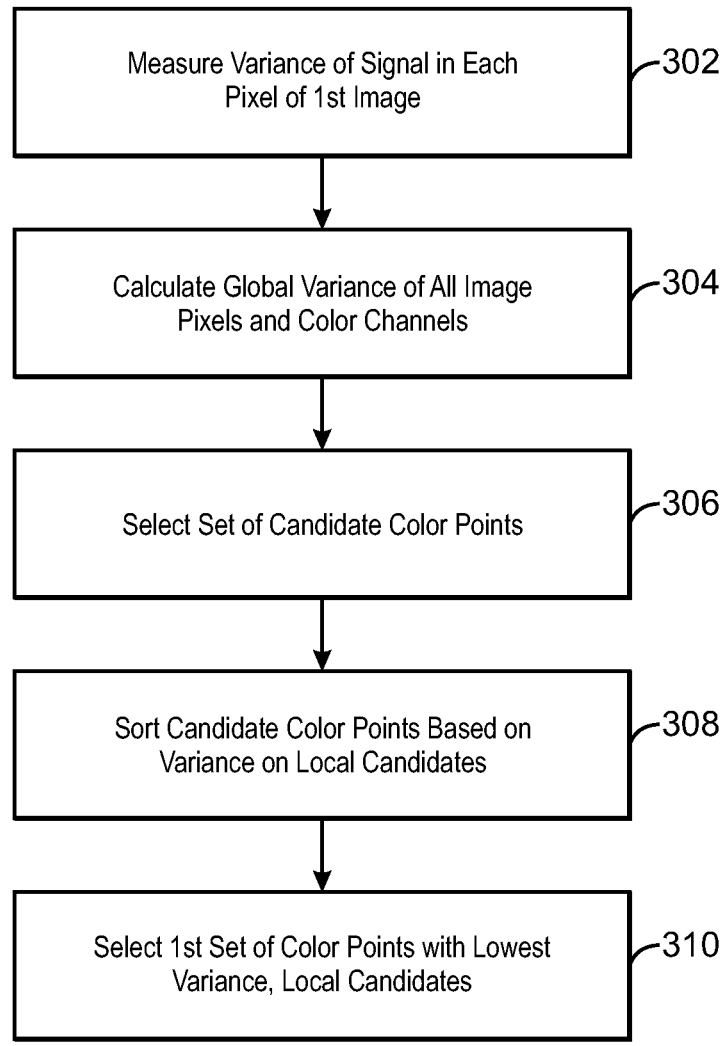
FIG. 3 is a process flow diagram of a method for selecting a first set of feature points, in accordance with an exemplary embodiment of the present invention.
Figure 4:
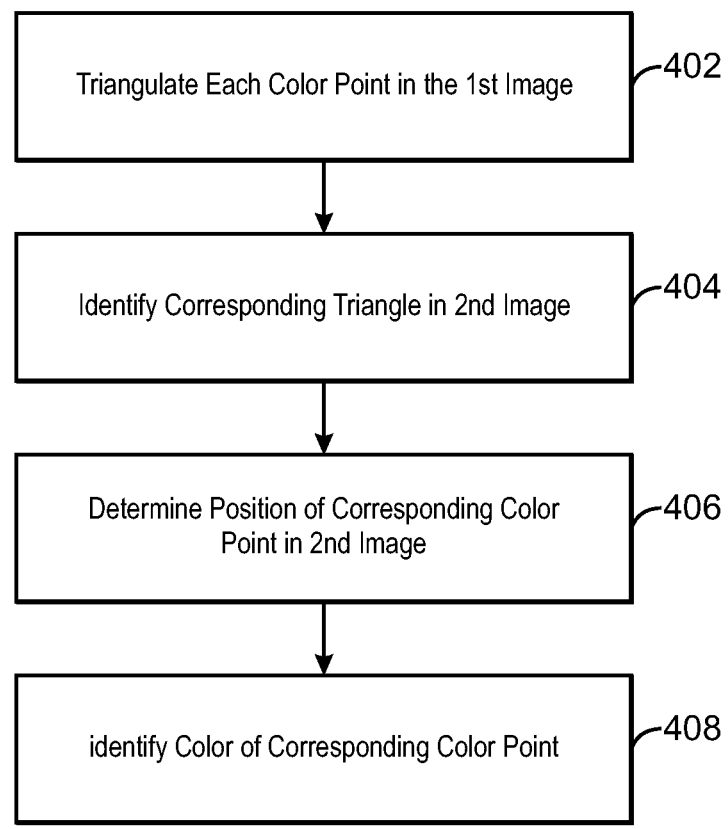
FIG. 4 is a process flow diagram of a method for interpolating the second set of color points, in accordance with an exemplary embodiment of the present invention.

The method 200 is described in greater detail with respect to FIGS. 3 and 4. FIGS. 3 and 4 are described in the context of an example implementation for stereographic image processing that uses left and right images for input. For clarity, it is noted that the left and right images of the sample implementation represent the first and second images described with reference to FIG. 2. Further, the input images include three color channels: red, green and blue (RGB).

Additionally, in the example implementation of the method 200, feature point correspondences are calculated using the SIFT algorithm. The SIFT algorithm is based on the detection of feature points in left and right images. The detection is based on texture descriptors in different levels of resolution in a Gaussian pyramid of images. The SIFT algorithm is also based on a description of feature points in the left and right images based on Differences of Gaussians. Additionally, the SIFT algorithm is based on the establishment of correspondences between feature points in the left and the right image based of their description. The left and right images referred to in this description correspond to the first and second images described above, respectively.

FIG. 3 is a process flow diagram of a method 202 for selecting a first set of feature points, in accordance with an exemplary embodiment of the present invention. The method 202 begins at block 302, where a spatial variance of the image signal is measured in each pixel of the first image. The spatial variance is measured in each color channel, resulting in three variances, $\sigma_R^2$, $\sigma_G^2$, $\sigma_B^2$. At block 304, the global spatial variance, $\sigma^2$, of all image pixels and all color channels is calculated for the first image.

At block 306, a set of candidate color points is selected. The selected candidate color points satisfy Equation 1, $$\sigma_R^2 < k\sigma^2, \sigma_G^2 < k\sigma^2, \sigma_B^2 < k\sigma^2 \qquad \text{EQUATION 1}$$

with k being a constant factor between 0 and 1, typically k=0.25.

At block 308, the candidate color points are sorted based on the variance values and the number of candidate points in proximity, i.e., a local spatial neighborhood. At block 310, the first set of color points is selected from the candidate color points with the lowest variance values, and fewest local candidate color points.

In an embodiment, the described process for the selection of the first set of color points is carried out separately for a predefined set of non-overlapping image regions. Such image regions may be a partition of the first image into rectangular blocks. In this case, for each image region, a global spatial variance, $\sigma^2$, is calculated. For each image region, color points are selected. The first set of color points is build from the selected color points of all regions.

FIG. 4 is a process flow diagram of a method 208 for interpolating the second set of color points, in accordance with an exemplary embodiment of the present invention. The method 208 may be performed by the table generator 118, and may begin at block 402, where each of the first set of color points may be triangulated. Triangulating the first set of color points means Building a first complete set of feature points being the first set of feature points and the four corner points of the first image;

Triangulating the first complete set of feature points;

For each color point of the first set of color points, identifying the triangle that includes the color point;

In one embodiment, this triangularization may be a Delaunay triangularization implemented using methods such as incremental triangularization. Each triangle consists of one of the following: three feature points that are close to the color point, two feature points and one corner point that are close to the color point, one feature point and two corner points that are close to the color point, or three corner points that are close to the color point.

At block 404, for each color point of the first image, the corresponding triangle in the second image is identified. The corresponding triangle may be identified using either the corresponding feature points in the second image or the corresponding image corners of the second image.

At block 406, for each color point of the first image, the position of the corresponding color point in the second image is determined. The corresponding color point may be determined using tri-linear interpolation. The position of the corresponding color point in the second image may be rounded to an integer. At block 408, the color of the corresponding color point in the second image may be identified.

In one embodiment, the detection of corresponding color points in second input image may be performed by applying the same criterion for detection of weak texture to the second image, and keeping only corresponding color points that show weak texture in both images.

The techniques disclosed herein provide several advantages. The generated CLUT 114 may provide advantages in precision, coverage, and robustness. In terms of precision, the values of the CLUT 114 are chosen in image areas with weak local image texture. In this way, spatial errors have low impact on colors. Coverage includes both coverage of the image and the color space. The values of the CLUT 114 may consist of more corresponding colors than the number of used geometrical feature point correspondences. In terms of robustness, the corresponding colors rely on geometric feature point correspondences that are known to be robust.

The invention claimed is:

1. A method for generating a color lookup table for a plurality of images, comprising:
   selecting a first plurality of color points comprising weak image texture, from a first image;
   identifying a first plurality of feature points that lie in a spatial neighborhood of each of the first plurality of color points;
   identifying a second plurality of feature points from a second image, wherein the second plurality of feature points correspond to the first plurality of feature points;
   determining a second plurality of color points in the second image corresponding to the first plurality of color points, using a spatial interpolation of the first plurality of color points from the first plurality of feature points and then applying the obtained spatial interpolation to the second plurality of feature points; and
   generating the color lookup table, including a plurality of input colors comprising the first plurality of color points, and a plurality of output colors comprising the second plurality of color points.

2. The method according to claim 1, comprising:
   identifying a third plurality of feature points from a third image,
   wherein the third plurality of feature points correspond to the second plurality of feature points;
   determining a third plurality of color points in the third image corresponding to the second plurality of color points, using a spatial interpolation of the second plurality of color points from the second plurality of feature points and then applying the obtained spatial interpolation to the third plurality of feature points; and
   generating the color lookup table, including a plurality of input colors comprising the second plurality of color points, and a plurality of output colors comprising the third plurality of color points.

3. The method according to claim 1, wherein selecting the first plurality of color points comprises:
   measuring a variance of signal in each pixel of the first image for each of a red color channel, a green color channel, and a blue color channel;
   calculating a global variance of the plurality of pixels and color channels; and
   selecting a plurality of candidate color points from the plurality of pixels, wherein all of the following are less than the global variance and multiplied by a constant between zero and one:
   the variance of signal for the red color channel;
   the variance of signal for the green color channel; and
   the variance of signal for the blue color channel.

4. The method according to claim 1, comprising selecting the feature points using a Scale Invariant Feature Transform for the first image and the second image.

5. The method according to claim 1, wherein determining the second plurality of color points comprises:
   triangulating each color point of the first plurality of color points by associating a triangle to each color point, each triangles having three edge points, the edge points being selected from the first set of feature points and the four corners of the first image in a way that the color point is included in the triangle;
   for each color point of the first plurality of color points and its associated triangle, determining the position of a color point in the second image corresponding to the color point of the first plurality of color points by identifying the corresponding triangle in the second image and spatial interpolation of color points from triangle edge points; and
   identifying a color of the color point in the second image.

6. The method according to claim 1, wherein determining the second plurality of color points comprises detecting pixels comprising a weak texture in the second image, wherein the second plurality of color points comprises corresponding color points that show weak texture in the first image and the second image.

7. A system for generating a color lookup table for a first image and a second image, comprising:
   a processor; and
   a tangible, machine readable memory comprising code configured to direct the processor to:
   select a first plurality of color points comprising weak image texture, from the first image;
   identify a first plurality of feature points that lie in a spatial neighborhood of each of the first plurality of color points;
   identify a second plurality of feature points from the second image based on a scale invariant feature transform of the first plurality of feature points, wherein the second plurality of feature points correspond to the first plurality of feature points;
   determine a second plurality of color points in the second image corresponding to the first plurality of color points, using a spatial interpolation of the first plurality of color points from the first plurality of feature points and then applying the obtained spatial interpolation to the second plurality of feature points; and
   generate the color lookup table, including a plurality of input colors comprising the first plurality of color points, and a plurality of output colors comprising the second plurality of color points.

8. The system according to claim 7, wherein the tangible, machine readable memory comprises code configured to direct the processor to:
   identify a third plurality of feature points from a third image, wherein the third plurality of feature points correspond to the second plurality of feature points;
   determine a third plurality of color points in the third image corresponding to the second plurality of color points, using spatial interpolation from the second plurality of feature points to the third plurality of feature points; and
   generate the color lookup table, including a plurality of input colors comprising the second plurality of color points, and a plurality of output colors comprising the third plurality of color points.

9. The system according to claim 7, wherein selecting the first plurality of color points comprises:
   measuring a variance of signal in each pixel of the first image for each of a red color channel, a green color channel, and a blue color channel;
   calculating a global variance of the plurality of pixels; and
   selecting a plurality of candidate color points from the plurality of pixels, wherein all of the following are less than the global variance and multiplied by a constant between zero and one:
   the variance of signal for the red color channel;
   the variance of signal for the green color channel; and
   the variance of signal for the blue color channel.

10. The system according to claim 7, wherein the tangible, machine readable memory comprises code configured to direct the processor to select the feature points using a Scale Invariant Feature Transform for the first image and the second image.

11. The system according to claim 7, wherein determining the second plurality of color points comprises:
   triangulating each of the first plurality of color points;
   identifying a triangle in the second image corresponding to a triangle in the first image comprising a color point of the first plurality of color points;
   determining a position of a color point in the second image corresponding to the color point of the first plurality of color points; and
   identifying a color of the color point in the second image.

12. The system according to claim 7, wherein determining the second plurality of color points comprises detecting pixels comprising a weak texture in the second image, wherein the second plurality of color points comprises corresponding color points that show weak texture in the first image and the second image.

\* \* \* \* \*